United States Patent [19]

Sundström

[11] Patent Number: 5,524,518
[45] Date of Patent: Jun. 11, 1996

[54] SAW BLADE

[75] Inventor: Erik Sundström, Sandviken, Sweden

[73] Assignee: Sandvik AB, Sandviken, Sweden

[21] Appl. No.: 237,999

[22] Filed: May 4, 1994

[30] Foreign Application Priority Data

Nov. 4, 1991 [SE] Sweden ................... 9103232

[51] Int. Cl.⁶ ................................ B27B 33/08
[52] U.S. Cl. ............................... 83/845; 83/835
[58] Field of Search ....................... 83/835, 845

[56] References Cited

U.S. PATENT DOCUMENTS

| | | |
|---|---|---|
| 174,216 | 2/1876 | Emerson . |
| 246,703 | 9/1881 | Atkins . |
| 303,787 | 8/1884 | Arnold . |
| 1,608,182 | 11/1926 | Pospiech . |
| 1,723,843 | 8/1929 | Chapin . |
| 2,667,904 | 2/1954 | Gommel . |
| 4,801,224 | 1/1989 | Pettersson et al. . |

FOREIGN PATENT DOCUMENTS

| | | |
|---|---|---|
| 2633479 | 2/1978 | Germany . |
| 331013 | 12/1970 | Sweden . |
| 120050 | 8/1927 | Switzerland . |
| 899341 | 1/1982 | U.S.S.R. . |

*Primary Examiner*—Kenneth E. Peterson
*Attorney, Agent, or Firm*—Burns, Doane, Swecker & Mathis

[57] ABSTRACT

Saw blade, especially a circular saw blade, with replaceable tips wedged in recesses along the periphery of the blade, and held there by elastic forces. Inwards of each recess, but not connected with the recess, at least one tension distributing hole is provided. The contour of the blade body runs inwards from a line between the edges of the tips so far that the bottom of the contour lies farther from the line between the tips than the outer portion of the tension distributing holes, but closer to that line between the tips than the inner portion of said holes. With this arrangement the elastic wedging forces produce tangential tension stresses and only local compressive stresses.

9 Claims, 2 Drawing Sheets

SAW BLADE

The present application is a continuing application of PCT application number PCT/SE92/00725 and Swedish patent application number 9103232-6, filed Oct. 16, 1992 and Nov. 4, 1991, respectively.

BACKGROUND AND SUMMARY OF THE PRESENT INVENTION

Circular saws have long been used for sawing of wood as well as metal. It is known that in order to saw straight, saw blades with a thickness less than one percent of the diameter have to be provided with internal stresses comprising tensile stresses around the periphery and compressive stresses in the center, which is accomplished through tensioning by hammering or rolling of the central parts of the saw blade. A saw blade with correct tensioning can be made with a thickness down to 0.5% of the diameter. If in addition the thickness is varied by making the central parts thicker, the peripheral parts can be made with a thickness down to 0.2% of the diameter. Thin kerfs are economically important because of lesser consumption of raw materials and energy. Similarly, to make straight cuts with a bandsaw, compressive stresses at the edges must be avoided.

Since large circular saw blades are heavy and bulky, a need has long been felt to make them with replaceable cutting tips, to avoid removing and regrinding of the whole saw blade when one tooth is damaged. Some earlier suggested solutions are shown in U.S. Pat. Nos. 174,216, 246,703 and 303,787. This need has become stronger as more wear resistant but brittle materials have become available, such as sintered tungsten carbide, and have been used as permanently brazed tips on circular saw blades and to a lesser extent on bandsaws.

Replaceable tips have found little application on saws, restricted to thick circular saws for wood, and for thick slot milling cutters. The tip holder designs commonly used for lathe tools have not been possible to use on saw blades, for several reasons. Tip holders comprising screws require a substantial thickness to make room for a screw with sufficient strength, and the same holds for holders comprising various kinds of eccentrics.

Tip holders where the tip is elastically wedged produce compressive stresses in the vicinity of the wedged surfaces. Therefore, these wedged tips cannot be used for thin saw blades, although they have been used for turning of narrow grooves and for slot milling cutters. The use of elastically wedged tips is further prevented by the heating of the tips and their vicinity relative to the rest of the saw blade during sawing. Moreover, tungsten carbide has a lower heat expansion than steel and thus needs harder wedging than what corresponds to the cutting forces. It is known to provide slots or holes close to the periphery of the saw blade, as shown in U.S. Pat. Nos. 1,723,843 and 2,667,904, but the known arrangements have not been adequate to counteract the compressive stresses from wedging of replaceable tips.

The present invention concerns a saw blade for use with elastically wedged replaceable tips, where neither the wedging nor the heating during sawing will produce compressive stresses around the periphery, and where consequently replaceable tips can be used on this saw blade. If some teeth are damaged, the invention allows replacement of only the damaged tips, instead of removing the whole blade for regrinding or rebrazing.

A saw blade according to the present invention comprises a blade body of metal with a plurality of recesses along its periphery, where the tip is wedged between clamping surfaces, according to known art described in the published EP patent document 095 062 or the U.S. patents mentioned above. Other shapes of the clamping surfaces are also possible, and the clamping surfaces can be parallel or converge outwards or inwards. The tips can be made with or without a tapered entering portion, but should preferably have at least one convex or concave locating surface guided by a corresponding locating surface in the recess. The tips extend outside the blade body surface on at least one side.

According to the invention, the blade body is provided with gullets or slots in front of and behind each recess. The gullets or slots are substantially deeper than the recess. Radially inwards of each recess is at least one tension distributing hole with a closed contour not connected with the recess but separated from the recess by a bridge, the distributing hole is partly located closer to the periphery than the bottom of the gullets or slots.

The function of the tension distributing hole is to let the blade body parts between the gullets or slots act as two levers joined by the bridge. When the peripheral ends of the levers are pressed apart by the wedging forces during insertion of a tip, or by thermal expansion when sawing, the bridge acts as a hinge and the inner ends of the levers approach each other causing a tangential tensile stress in the blade body. This keeps the saw blade flat and increases the resonance frequency. The saw blade properties are thus improved by hard clamping or heating, in contrast to blades of the prior art which strongly deteriorate in such circumstances.

In a preferred form, the tension distributing holes are preferably shaped generally like an inverted "T", with one hole inwards of each recess, or generally L-shaped with two holes inwards of each recess.

In sawing of metal, the cutting speed is limited and there is little risk of the tips being thrown out of the recesses by centrifugal forces, but in sawing of wood with much higher cutting speed, it is suitable to secure the tips with pins or tubular pegs as shown in U.S. Pat. No. 1,608,182.

To make sure that all tips are cutting, the radial position of the tips must be well defined. This is most easily achieved by tangential supporting surfaces on the tip and on the recess. The supporting surfaces can be located at the rear of the tip as in U.S. Pat. No. 303,787, at the underside of the tip as in U.S. Pat. No. 174,216, or at the front of the tip as in U.S. Pat. No. 4,801,224. It has also been suggested to make the tip with a projection as in U.S. Pat. No. 246,703 to combine the radial positioning with securing against centrifugal forces, but that would lead to excessive deformation when removing or inserting the tips.

BRIEF DESCRIPTION OF THE DRAWINGS

The present invention will be described with reference to the accompanying drawings, wherein like members bear like reference numerals and wherein.

DETAILED DESCRIPTION OF THE PREFERRED EMBODIMENTS

Figure 1:
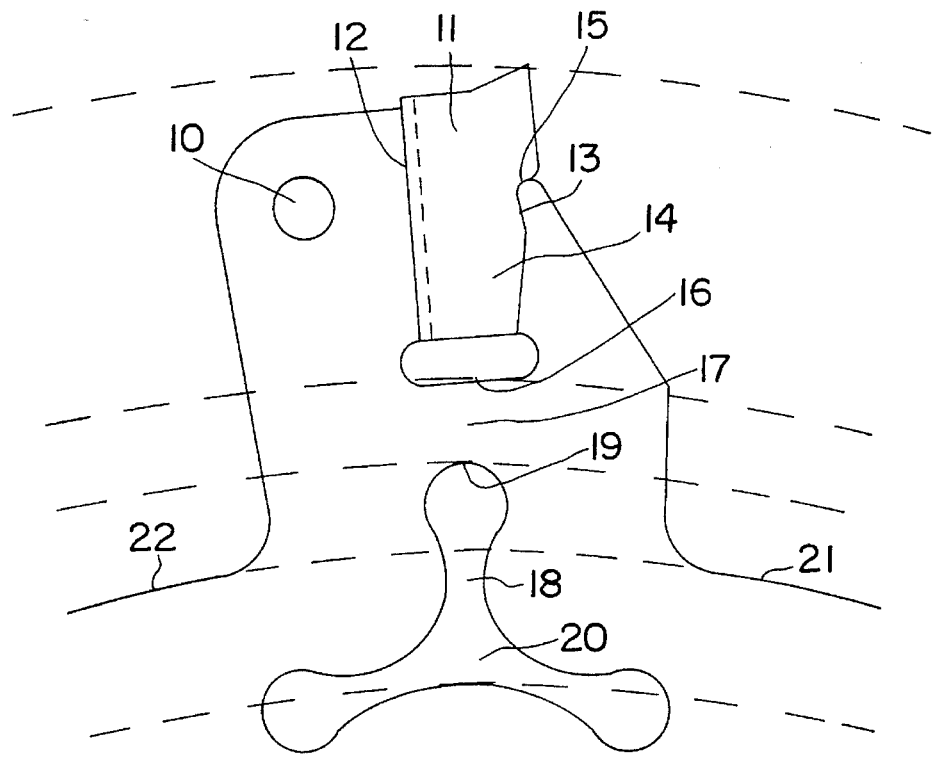
FIG. 1 is a view of a tip and a recess with large gullets on both sides.

The tip (11) is in all figures shown as described in U.S. Pat. No. 4,801,224, where the clamping forces are applied on parallel surfaces (12, 13), and the inner portion (14) of the tip is tapering to facilitate insertion. The radial position of the tip is determined by a step (15) on the front side. Below the tip (11) is an empty part of the recess at the bottom (16). Behind the recess is a hole (10) against which a lever is rested for removing or inserting a tip. Radially inwards of the recess button (16) is a tension distributing hole (18) (FIG. 1), generally shaped as an inverted "T" with the vertical part in the tangential direction. The outer part (19) of the tension distributing hole is rounded to avoid crack formation, and between the outer part and the bottom (16) of the recess is a bridge (17) of the blade body material. The inner part (20) of the tension distributing hole (18) extends further in a tangential direction than the outer part (19). In front of the tip is a front gullet (21) and behind the tip is a rear gullet (22) which can be contiguous with the front gullet at the following tip. The bottoms of the gullets (21, 22) which define a partial, circumferential contour or contour line should be located at a smaller radial distance to the line between the tip edges compared to the inner part (20) of the tension distributing hole and at a larger distance compared to the outer part (19).

Figure 2:
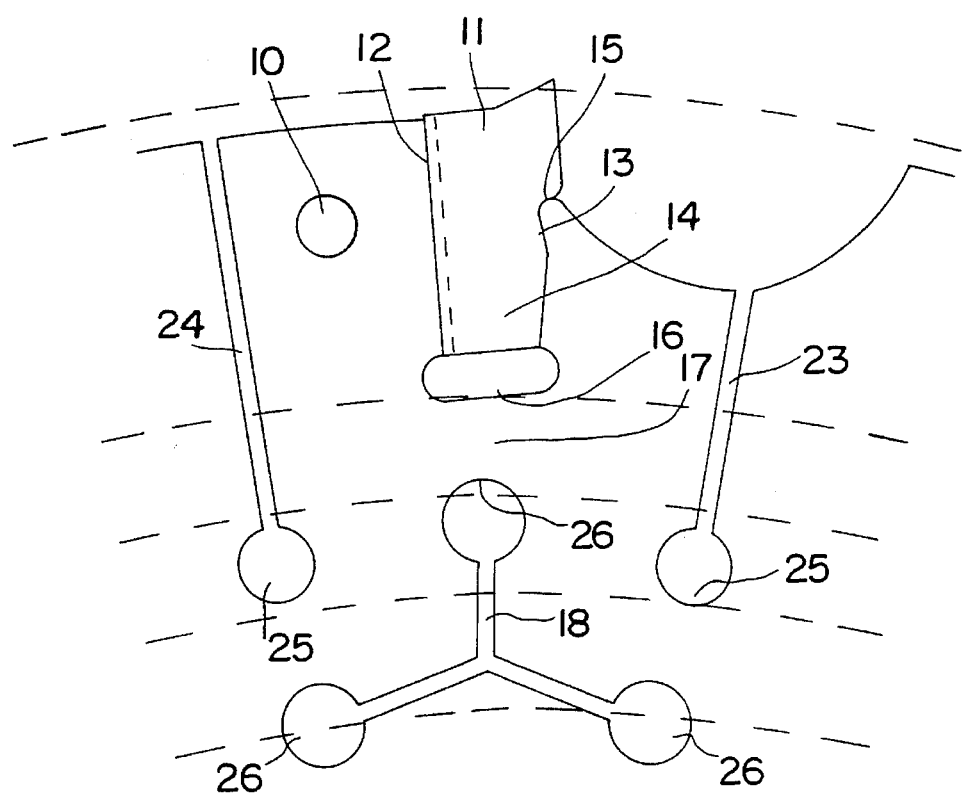
FIGS. 2 and 3 are views of a tip and a recess with smaller gullets and narrow slots on both sides of the recesses.

In many applications it is unsuitable to have large gullets, and the blade can then be made with a contour or contour line comprising radial slots in front (23) and in the rear (24) of the tip as shown in FIG. 2. To lower the risk of crack formation, the slots have terminations with large radius, such as round holes (25). The terminations (25) should then be located with a smaller radial distance to the line between the tip edges compared to the inner part (20) of the tension distributing holes and at a larger distance compared to the outer part (19). The tension distributing holes (18) can also be made as slots with large radius terminations (26) as in FIG. 2.

Figure 3:
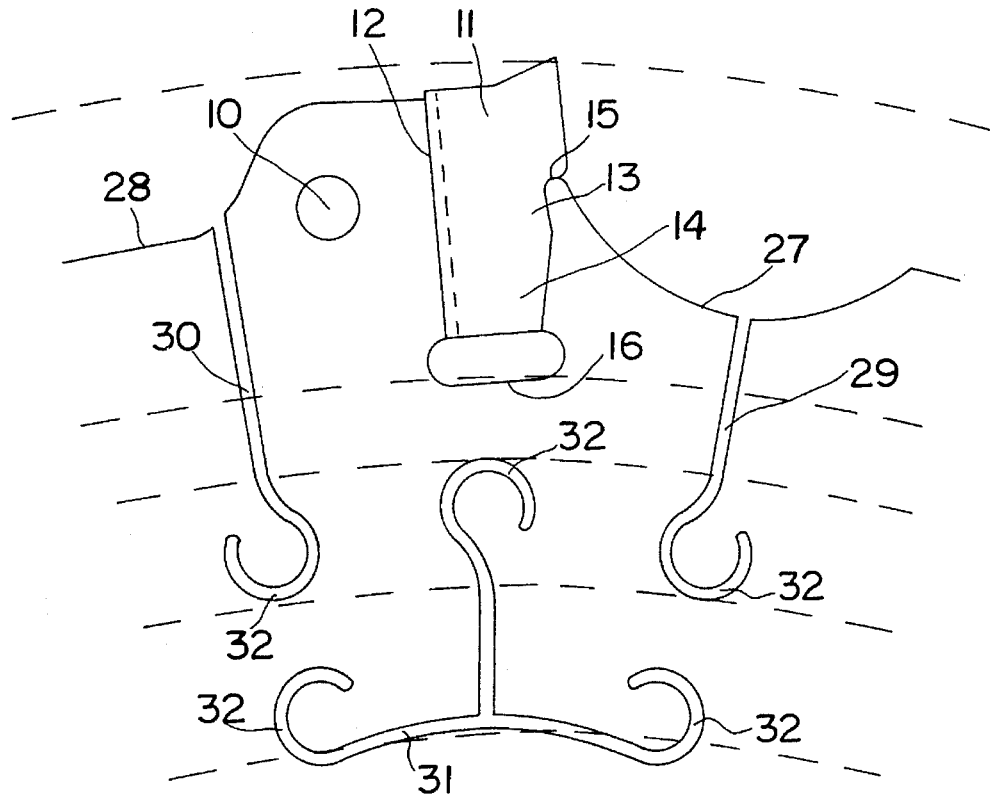
Figure 4:
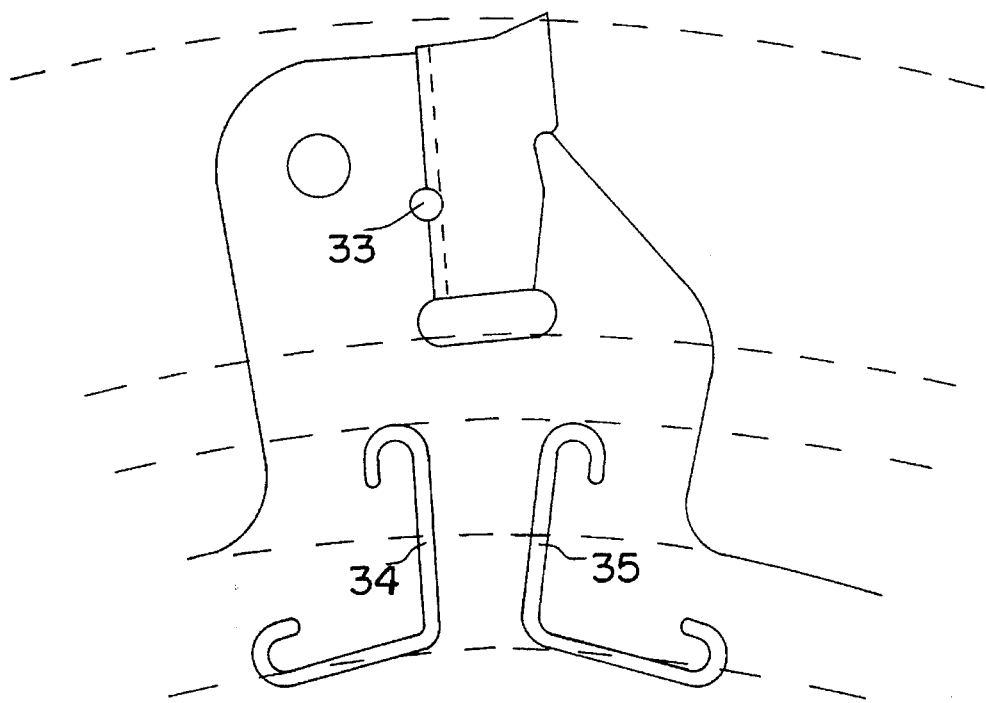
FIG. 4 is a view of an embodiment with two tension distributing holes.

The tension distributing hole can be made as at least a partly open hole (18) as shown in FIGS. 1 and 2, or as a narrow, laser-cut slot (31, 34, 35) with curled ends (32) (FIGS. 3 and 4). Likewise, the radial slots can be terminated with either large radius holes (25) or laser-cut curled ends (32) (FIG. 3). The tension distributing holes and slots can be left empty or filled with some easily deformable material such as synthetic resin or soft ductile metal.

With reference to FIG. 4, an alternate embodiment is shown where the tension distributing hole is a group of two L-shaped holes (34, 35) which together give the same effect as the inverted T-shaped hole of FIGS. 1 or 3. In addition, the metal strip between the L-shapes of FIG. 4 increases the resistance to lateral forces acting on the tip during sawing.

A circular saw blade according to the invention has several tips distributed around the periphery. For sawing of metal, it is advantageous to make every second tip higher with large chamfers and short horizontal edges, and make the every other tip between the first mentioned tips lower with long horizontal edges. The arrangement of tips makes all chips narrow and keeps the chips from rubbing or sticking to the sides of the kerf. For sawing of wood, tips with a long horizontal edge can be used throughout, and to secure the tips against centrifugal forces, the recess is preferably made with a notch (33) (FIG. 4) for tubular pegs.

The invention has been described as applied to circular saw blades, but could also be applied to other types of saw blades, such as straight blades for gang saws, power hacksaws and bandsaws, or annular saw blades. The advantages are the same in all cases: improved straightness of the cut due to internal tensile stresses along the periphery, and a possibility to exchange the damaged tips only when some damage has occurred.

The invention which is intended to be protected is not limited by the preferred embodiments of the present invention. Rather, variations and changes can be made to the disclosed embodiments that fall within the scope of the appended claims.

What is claimed is:

1. Saw blade comprising:

a saw blade element having a plurality of recesses, directed inwardly relative to a cutting edge line that defines an outermost portion of the saw blade, along a periphery of the saw blade element;

a plurality of replaceable tips of a material that is harder than the saw blade element, each tip being wedged into a corresponding one of the plurality of recesses such that the tips are held in the saw blade element by forces created by elastic deformation of the saw blade element, a line extending between cutting edges of the tips defining the cutting edge line;

the periphery of the saw blade element being inwardly contoured to define a plurality of inwardly contoured peripheral surfaces between the recesses, innermost points of the inwardly contoured peripheral surfaces defining a contour line parallel to the cutting edge line, at least one inwardly contoured peripheral surface corresponding to each recess;

the saw blade element having a plurality of tension distributing holes located inwardly, relative to each recess, away from the the cutting edge line, the plurality of holes including at least one hole not connected with any recess, the tension reducing holes each having an outer portion and an inner portion, the inner portion being further from the cutting edge line than the outer portion, each recess corresponding to at least one hole and at least one inwardly contoured peripheral surface; and when measured in an inward direction perpendicular to the cutting edge line, a distance from a line, parallel to the cutting edge line, extending through an innermost point of each recess to the cutting edge line is less than a distance from a line, parallel to the cutting edge line, extending through an outer portion of a corresponding tension distributing hole to the cutting edge line, a distance from the cutting edge line to the contour line being less than a distance between a line extending through the inner portion of each of the tension distributing holes and the cutting edge line, and a distance from the cutting edge line to the contour line is greater than a distance from the cutting edge line to the line extending through the outer portion of the corresponding tension reducing hole.

2. Saw blade according to claim 1, wherein, for each of the tension distributing holes, the inner portion extends further in a direction parallel to the cutting edge line than the outer portion.

3. Saw blade according to claim 2, wherein each of the plurality of tension distributing holes comprises a hole with a generally inverted T-shape such that an innermost point of the T-shaped hole defines the inner portion and an outermost point of the T-shaped hole defines the outer portion.

4. Saw blade according to claim 2, wherein each of the plurality of tension distributing holes comprises two L-shaped holes such that innermost points of the L-shaped holes define the inner portion and outermost points of the L-shaped holes define the outer portion.

5. Saw blade according to claim 2, wherein the tension distributing holes are shaped as slots having curled ends.

6. Saw blade according to claim 1, wherein the inwardly contoured peripheral surfaces define gullets, innermost points of the gullets defining the contour line.

7. Saw blade according to claim 1, wherein the inwardly contoured peripheral surfaces define slots having walls.

8. Saw blade according to claim 7, wherein the walls are substantially parallel in an area between the cutting edge line and the contour line, the walls, in a direction inward from the contour line, diverging and then converging as the walls approach the contour line to form an enlarged opening.

9. Saw blade, comprising:

a circular saw blade element having a plurality of recesses, directed inwardly relative to a cutting edge line, along a periphery thereof;

a plurality of replaceable tips held in the recesses, the tips having cutting edges, a line extending between the cutting edges defining the cutting edge line;

at least one tension distributing hole provided radially inward of each recess, the tension distributing holes having radially outer portions and radially inner portions;

areas on the periphery of the saw blade element between the recesses having innermost points, the innermost points defining a contour line, the contour line being disposed radially inward from a line between edges of the tips; and the contour line being disposed radially farther from a cutting edge line between the edges of the tips than a line through the radially outer portions of the tension distributing holes and lying radially closer to the cutting edge line between the edges than a line through the inner portions of the tension distributing holes.

* * * * *